(12) United States Patent
Kim (10) Patent No.: US 10,670,895 B2
(45) Date of Patent: Jun. 2, 2020

(54) COVER GLASS, MANUFACTURING METHOD THEREOF, AND DISPLAY APPARATUS INCLUDING THE COVER GLASS

(71) Applicant: SAMSUNG DISPLAY CO., LTD., Yongin-si, Gyeonggi-do (KR)

(72) Inventor: Sungwoo Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 444 days.

(21) Appl. No.: 15/191,458

(22) Filed: Jun. 23, 2016

(65) Prior Publication Data
US 2017/0150626 A1    May 25, 2017

(30) Foreign Application Priority Data

Nov. 20, 2015 (KR) .................... 10-2015-0163484

(51) Int. Cl.
*G02F 1/1333* (2006.01)
(52) U.S. Cl.
CPC ............ *G02F 1/133308* (2013.01); *G02F 2001/133331* (2013.01); *Y10T 428/1041* (2015.01); *Y10T 428/1059* (2015.01); *Y10T 428/1095* (2015.01)
(58) Field of Classification Search
CPC ... G02F 1/133308; G02F 2001/133331; Y10T 428/1041; Y10T 428/1059; Y10T 428/1095
See application file for complete search history.

(56) References Cited

U.S. PATENT DOCUMENTS

| | | | | |
|---|---|---|---|---|
| 5,954,559 | A | * 9/1999 | Holmberg | G02F 1/133512 430/7 |
| 2002/0196393 | A1 | * 12/2002 | Tashiro | G02F 1/1303 349/106 |
| 2004/0135941 | A1 | * 7/2004 | Nam | G02F 1/133512 349/110 |

(Continued)

FOREIGN PATENT DOCUMENTS

| | | |
|---|---|---|
| KR | 10-0855666 | 9/2008 |
| KR | 10-2012-0075103 | 7/2012 |

(Continued)

*Primary Examiner* — Sophie Hon
(74) *Attorney, Agent, or Firm* — Lewis Roca Rothgerber Christie LLP (57) ABSTRACT

A cover glass, a method for manufacturing a cover glass, and a display apparatus including a cover glass are provided. A cover glass includes a transparent substrate including a display region and a non-display region adjacent to the display region; a guideline-printed layer on the substrate and including a first side surface defining a border between the display region and the non-display region, the guideline-printed layer configured to surround the display region when viewed in a plane; a UV pattern layer surrounding the guideline-printed layer when viewed in a plane, the UV pattern layer contacting a second side surface of the guideline-printed layer opposite the first side surface, the UV pattern layer arranged on a same layer as the guideline-printed layer, and overlapping the non-display region; and an opaque printed layer facing the substrate, wherein the UV pattern layer is between the opaque printed layer and the substrate.

17 Claims, 8 Drawing Sheets

(56) References Cited

U.S. PATENT DOCUMENTS

| | | | | |
|---|---|---|---|---|
| 2006/0066781 A1* | 3/2006 | Kim | ................ | G02F 1/133512 |
| | | | | 349/110 |
| 2011/0216275 A1* | 9/2011 | Lee | .................... | G02F 1/1335 |
| | | | | 349/106 |
| 2012/0235048 A1* | 9/2012 | Kim | ................ | G02F 1/133308 |
| | | | | 250/372 |

FOREIGN PATENT DOCUMENTS

| KR | 10-1233656 | 2/2013 | | |
|---|---|---|---|---|
| KR | 10-1336934 | 12/2013 | | |
| KR | 10-1425364 | 8/2014 | | |
| KR | 101425364 B1 * | 8/2014 | ........ | H04M 1/0283 |
| KR | 10-2015-0042092 | 4/2015 | | |

\* cited by examiner

COVER GLASS, MANUFACTURING METHOD THEREOF, AND DISPLAY APPARATUS INCLUDING THE COVER GLASS

CROSS-REFERENCE TO RELATED APPLICATION

This application claims priority to and the benefit under 35 U.S.C. § 119 of Korean Patent Application No. 10-2015-0163484, filed on Nov. 20, 2015, the entire content of which is hereby incorporated by reference.

BACKGROUND

Aspects of the present disclosure herein relate to a cover glass, a manufacturing method thereof, and a display apparatus including the cover glass.

A cover glass for protecting a display panel is installed on the front surface of the display panel such as a liquid crystal display (LCD), a plasma display panel (PDP), or a light-emitting diode (LED). Specifically, the cover glass is attached and fixed on to the outer surface of the display panel so that a user may identify a user input or an output of an apparatus from the outside.

The cover glass is provided on the outer surface of the apparatus, thereby directly affecting the design of the apparatus. Accordingly, for the cover glass, attempts have been made not only for the function for protecting a display panel but also for adding various designs to the cover glass.

Typically, a transparent synthetic resin has been used as the cover glass, but there have been limitations of a color change, a low transmittance or the like. Now, tempered glass which has advantages of remarkably superior transparency and a superior strength has been developed. Thus, cover glasses made of tempered glass are used as a substitute.

SUMMARY

According to aspects of the present disclosure, a cover glass includes a guideline-printed layer defining a display region and a non-display region, and a manufacturing method thereof, and a display apparatus including the cover glass are provided. According to an aspect of the present disclosure, a cover glass, a manufacturing method thereof, and a display apparatus including the cover glass, are capable of improving a yield.

According to an embodiment of the present inventive concept, a cover glass includes a substrate, a guideline-printed layer, a UV pattern layer, and a printed layer.

The substrate may include a display region configured to display an image, and a non-display region adjacent to the display region.

The guideline-printed layer may be disposed on the substrate. A first side surface of the guideline-printed layer may define a border between the display region and the non-display region, and the guideline-printed layer may surround the display region. In an embodiment, the guideline-printed layer may have a closed-loop shape.

The UV pattern layer may surround the guideline-printed layer when viewed in a plane, and contact a second side surface of the guideline-printed layer opposite the one side surface. The UV pattern layer may be disposed on a same layer as the guideline-printed layer, and overlap the non-display region.

In an embodiment, the guideline-printed layer may have a first thickness, and the UV pattern layer may have a second thickness greater than the first thickness.

The printed layer may face the substrate with the UV pattern layer disposed therebetween.

In an embodiment, the cover glass may further include a first color layer disposed between the UV pattern layer and the printed layer. In an embodiment, the cover glass may further include a second color layer disposed between the first color layer and the printed layer, and having a color different from the first color layer.

According to an embodiment of the present inventive concept, a method for manufacturing a cover glass includes forming a guideline-printed layer on a transparent substrate, forming a masking-printed layer, forming a UV pattern part, forming a printed layer, forming a UV pattern layer, and removing the masking-printed layer.

In an embodiment, the method may further include forming a first color layer on the UV pattern part after the forming of the UV pattern part. In an embodiment, the method may further include forming a second color layer on the first color layer after the forming of the first color layer.

In an embodiment, the masking-printed layer may overlap the display region on the guideline-printed layer in the forming of the masking-printed layer. In an embodiment, an opening may be provided between the masking-printed layer and the substrate.

In an embodiment, the masking-printed layer may include water-soluble ink, and the removing of the masking-printed layer may be performed by removing the masking-printed layer by using a cleaning solution.

In an embodiment, the UV pattern part may be formed to cover the substrate, the masking-printed layer, and the guideline-printed layer in the forming of the UV pattern part.

In an embodiment, the UV pattern part may be formed by etching a UV pattern sacrificial layer which is a portion of the UV pattern part exposed by the printed layer in the forming of the UV pattern part. In an embodiment, the UV pattern sacrificial layer may be removed by using an etching solution, and the etching solution may include a hydrofluoric acid. In an embodiment, the UV pattern sacrificial layer may overlap the display region when viewed in a plane, and may be formed overlapping the guideline-printed layer.

According to an embodiment of the present inventive concept, a display apparatus includes a display panel configured to display an image, and a cover glass arranged on the display panel.

The cover glass may include a substrate, a guideline-printed layer, a UV pattern layer, and a printed layer. In an embodiment, the cover glass may further include a first color layer between the UV pattern layer and the printed layer.

The substrate may include a display region configured to display an image, and a non-display region adjacent to the display region.

The guideline-printed layer may be disposed on the substrate. A first side surface of the guideline-printed layer may define a border between the display region and the non-display region, and surround the display region.

The UV pattern layer may surround the guideline-printed layer when viewed in a plane, and contact a second side surface of the guideline-printed layer opposite the one side surface. The UV pattern layer may be disposed on a same layer as the guideline-printed layer, and overlap the non-display region.

The printed layer may face the substrate with the UV pattern layer disposed therebetween.

BRIEF DESCRIPTION OF THE DRAWINGS

The accompanying drawings are included to provide a further understanding of the present inventive concept, and are incorporated in and constitute a part of this specification. The drawings illustrate some exemplary embodiments of the present inventive concept and, together with the description, serve to explain principles of the present inventive concept. In the drawings.

DETAILED DESCRIPTION

The present inventive concept may be modified in many alternate forms, and thus some embodiments will be exemplified in the drawings and described in further detail. It should be understood, however, that the present inventive concept is not limited to the particular form or forms disclosed, but, rather, the present inventive concept covers various modifications and equivalent arrangements included within the spirit and scope of the disclosure, including the appended claims.

Figure 1:
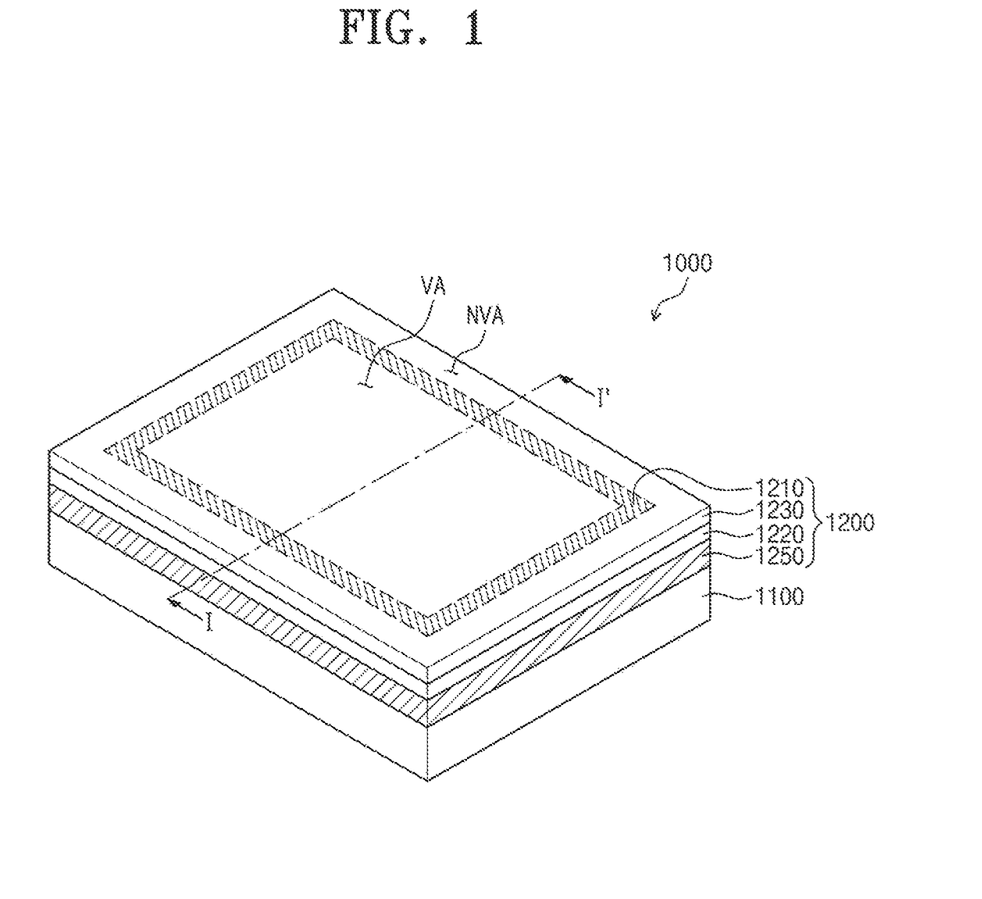
FIG. 1 is a perspective view of a display apparatus according to an embodiment of the present inventive concept.

FIG. 1 is a perspective view of a display apparatus 1000 according to an embodiment of the present inventive concept.

Referring to FIG. 1, a display apparatus 1000 includes a display panel 1100 and a cover glass 1200.

The display panel 1100 displays an image. The display panel 1100 may include any of various display panels, such as liquid crystal display panels, organic light emitting display panels, plasma display panels, electrophoretic display panels, electrowetting display panels, or the like.

The display panel 1100 may be provided in a plate shape. Although the shape and size of the display panel 1100 when viewed in a plane are not limited, FIG. 1 illustrates as an example that the display panel 1100 may be rectangular when viewed in a plane.

The cover glass 1200 is disposed on the display panel 1100. The cover glass 1200 may be provided in a plate shape. Although the shape and size of the display panel 1200 when viewed in a plane are not limited, FIG. 1 illustrates as an example that the cover glass 1200 may be rectangular when viewed in a plane.

The display panel 1100 may be damaged by a fingerprint, a scratch, or the like, and may also be damaged by external factors, such as water, dust, or the like. The cover glass 1200 protects the display panel 1100.

The cover glass 1200, according to an embodiment of the present inventive concept, includes a substrate 1250, a guideline-printed layer 1210, a UV pattern layer 1220, and a printed layer 1230.

Figure 2:
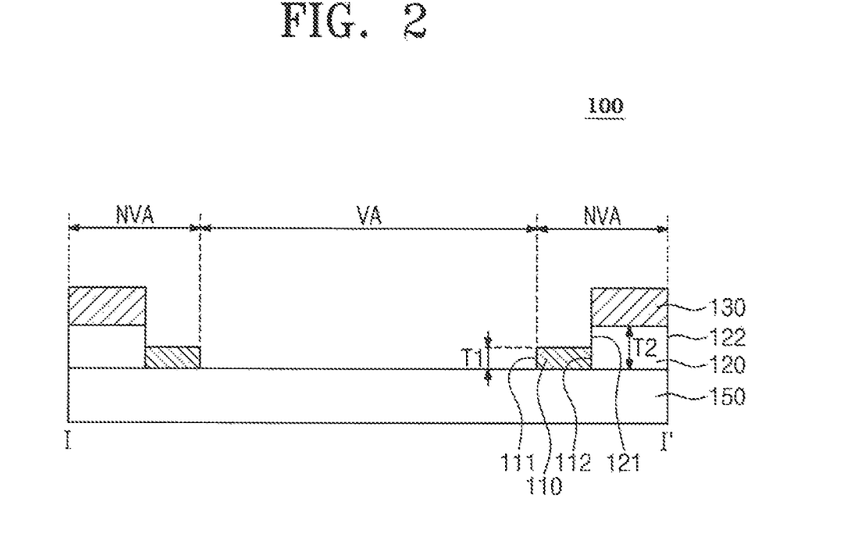
FIG. 2 is a cross-sectional view taken along the line I-I' of FIG. 1, illustrating a cover glass according to an embodiment of the present inventive concept.
Figure 3:
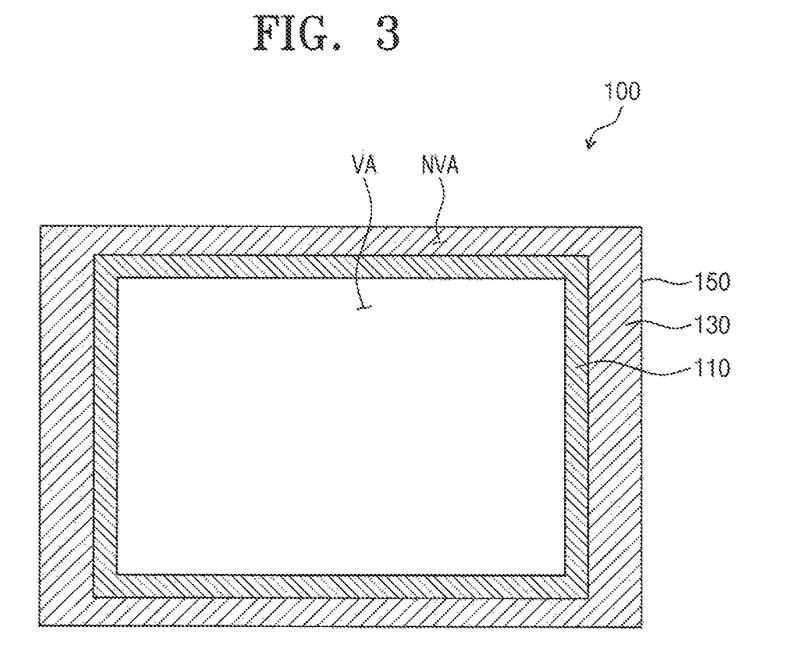
FIG. 3 is a plan view illustrating a cover glass according to an embodiment of the present inventive concept.

FIG. 2 is a cross-sectional view taken along line I-I' of FIG. 1 illustrating a cover glass 100 according to an embodiment of the present inventive concept; and FIG. 3 is a plan view illustrating the cover glass 100.

Referring to FIGS. 2 and 3, the cover glass 100 includes a substrate 150, a guideline-printed layer 110, a UV pattern layer 120, and a printed layer 130.

The substrate 150 is divided into a display region VA for displaying an image and a non-display region NVA adjacent to the display region VA.

The substrate 150 may be transparent or substantially transparent. Most of the light incident to the substrate 150 may pass through the substrate 150. The substrate 150 may be made of any of various materials such as tempered glass, ceramic, polymer resin, or the like.

The guideline-printed layer 110 is disposed on the substrate 150. According to an embodiment, the guideline-printed layer 110 has an opaque black color, but embodiments of the present inventive concept are not limited thereto, and the guideline-printed layer 110 may have any of various colors.

When the guideline-printed layer 110 is opaque, the light incident into the guideline-printed layer 110 is blocked. Accordingly, a region on which the guideline-printed layer 110 is disposed is included in the non-display region NVA. Thus, one side surface 111 of the guideline-printed layer 110 defines a border between the display region VA and the non-display region NDA, and the guideline-printed layer 110 surrounds the display region VA when viewed in a plane.

The shape of the guideline-printed layer 110 is not limited, and may be any shape surrounding the display region VA. The guideline-printed layer 110 may have a closed-loop shape with the display region VA therein.

The guideline-printed layer 110 may include any of various materials such as an acryl resin, a urethane resin, or an epoxy resin.

The UV pattern layer 120 surrounds the guideline-printed layer 110 when viewed in a plane. One side surface 121 of the UV pattern layer 120 contacts another side surface 112 of the guideline-printed layer 110 opposite the one side surface 111 of the guideline-printed layer 110. The UV pattern layer 120 is disposed on the substrate 150. The UV pattern layer 120 and the guideline-printed layer 110 are disposed on the same layer and overlap the non-display region NVA.

Another side surface 122 of the UV pattern layer 120 may be aligned to coincide with a side surface of the substrate 150. In this case, the guideline-printed layer 110 and the UV pattern layer 120 may cover the entire non-display region NVA of the substrate 150.

The guideline-printed layer 110 has a first thickness T1, and the UV pattern layer 120 has a second thickness T2 greater than the first thickness T1. Although not shown in FIG. 2, according to an embodiment, in a step of forming the UV pattern layer 120, the UV pattern part covers the guideline-printed layer 110, and a UV pattern sacrificial layer is subsequently etched to form the UV pattern layer 120. A manufacturing method will be described further later herein.

The UV pattern layer 120 includes a UV curable resin and may include a plurality of UV curable resins different from one another. The UV pattern layer 120 may be formed of a transparent material.

The UV pattern layer 120 may have any of various patterns, and the pattern may be viewed from the other side surface facing the surface on which the UV pattern layer 120 contacts the substrate 150.

The printed layer 130 is disposed on the UV pattern layer 120. The printed layer 130 overlaps the non-display region NVA.

According to an embodiment, one side surface of the printed layer 130 may be aligned to the one side surface 121 of the UV pattern layer 120. Also, the other side surface of the printed layer 130 may be aligned to the other side surface 122 of the UV pattern layer 120 and the side surface of the substrate 150. In this case, the guideline-printed layer 110 and the printed layer 130 may cover the entire non-display region NVA of the substrate 150. According to an embodiment, the printed layer 130 may have a plurality of layers.

The printed layer 130 is formed of an opaque material. Accordingly, images are not displayed on the region overlapping the printed layer 130. According to an embodiment, the printed layer 130 may be formed of the same material as that of the guideline-printed layer 110.

Figure 4:
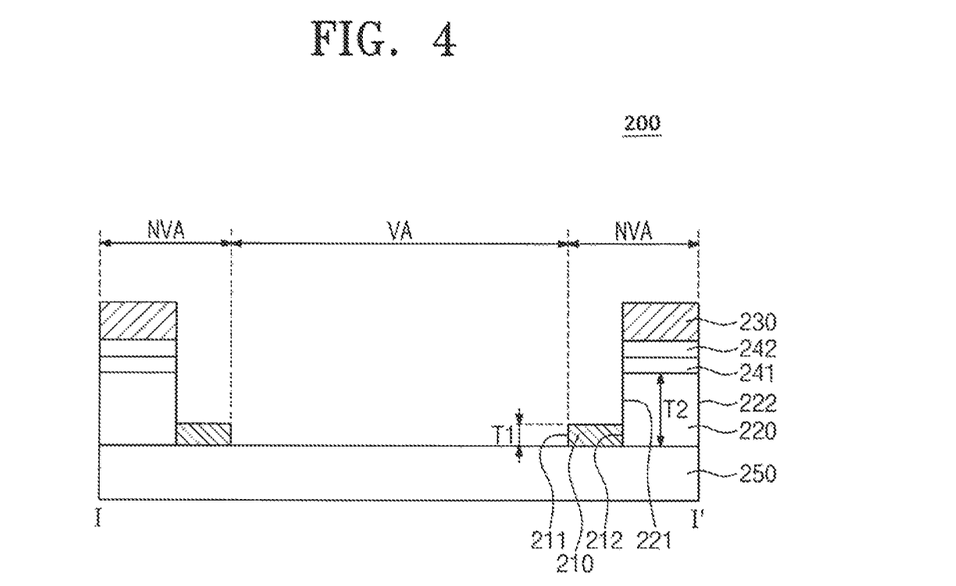
FIG. 4 is a cross-sectional view taken along the line I-I' of FIG. 1, illustrating a cover glass according to another embodiment of the present inventive concept.

FIG. 4 is a cross-sectional view illustrating a cover glass 200 according to another embodiment of the inventive concept.

The cover glass 200 according to another embodiment of the inventive concept includes a substrate 250, a guideline-printed layer 210, a UV pattern layer 220, a printed layer 230, a first color layer 241, and a second color layer 242.

The first color layer 241 is disposed between the UV pattern layer 220 and the printed layer 230. The second color layer 242 is disposed between the first color layer 241 and the printed layer 230. Although not shown, the number of color layers is not limited, and a plurality of color layers (e.g., more than two color layers) may be disposed between the UV pattern layer 220 and the printed layer 230.

According to an embodiment, one side surface 211 of the guideline-printed layer 210 defines a border between the display region VA and the non-display region NDA, and one side surface 221 of the UV pattern layer 220 may contact another side surface 212 of the guideline-printed layer 210 opposite the one side surface 211 of the guideline-printed layer 210. Respective side surfaces of the first and second color layers 241 and 242 may be aligned to coincide with the one side surface 221 of the UV pattern layer 220, and opposite respective side surfaces of the first and second color layers 241 and 242 may be aligned to coincide with the other side surface 222 of the UV pattern layer 220.

The first and second color layers 241 and 242 may be formed of a material having a color. The first and second color layers 241 and 242 may have colors different from each other. The wavelength of light may be adjusted by the combination of the first and second color layers 241 and 242, and a third color different from the color of the first color layer 241 and the color of the second color layer 242 may be implemented. Accordingly, various colors may be implemented by a plurality of color layers.

The first and second color layers 241 and 242 may be formed of materials having light reflectivity different from each other. When the material of the first color layer 241 or the second color layer 242 has a high light reflectivity, a mirror having a color may be implemented.

Figure 5:
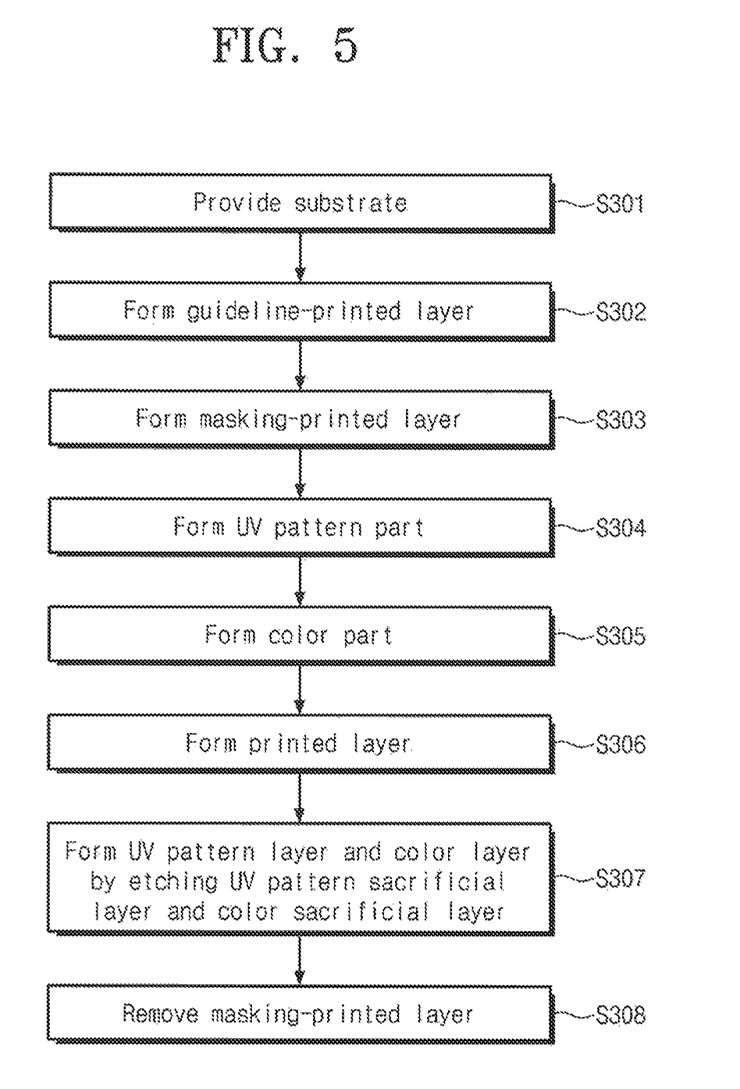
FIG. 5 is a flow chart illustrating a method for manufacturing a cover glass according to an embodiment of the present inventive concept.

FIG. 5 is a flow chart illustrating a method for manufacturing a cover glass according to an embodiment of the present inventive concept; and FIGS. 6 to 12 are cross-sectional views illustrating a method for manufacturing a cover glass according to an embodiment of the present inventive concept.

Referring to FIG. 5, a method for manufacturing a cover glass according to an embodiment of the present inventive concept includes: providing a substrate 350 (S301); forming a guideline-printed layer 310 (S302); forming a masking-printed layer 360 (S303); forming a UV pattern part 320 (S304); forming a color part 340 (S305); forming a printed layer 330 (S306); forming a UV pattern layer 321 and a color layer 341 by etching a UV pattern sacrificial layer 322 and a color sacrificial layer 342 (S307); and removing the masking-printed layer 360 (S308).

Figure 6:
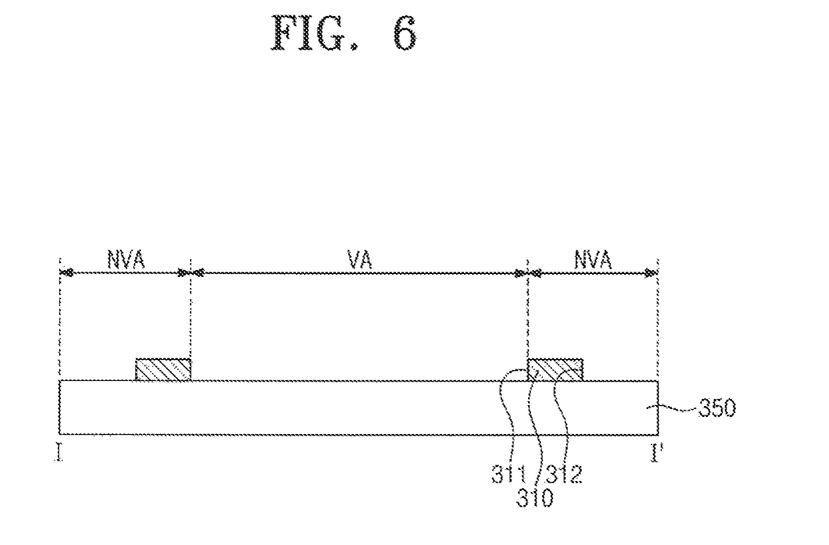
FIGS. 6 to 12 are cross-sectional views illustrating a method for manufacturing a cover glass according to an embodiment of the present inventive concept.

FIG. 6 is a cross-sectional view illustrating the forming of the guideline-printed layer 310 (S302) on the substrate 350, illustrated in FIG. 5.

The guideline-printed layer 310 is formed on the substrate 350. The guideline-printed layer 310 includes an opaque material. According to an embodiment, the guideline-printed layer 310 may be a black matrix layer printed by using black ink.

The guideline-printed layer 310 may include an inorganic compound, such as a metal oxide, or an organic compound such as a polymer resin (e.g., a urethane resin, an epoxy resin, an acryl resin, or the like). The guideline-printed layer 310 may include a material which does not react with an etching solution used in the forming of the UV pattern layer 321 and the color layer 341 by etching the UV pattern sacrificial layer 322 and the color sacrificial layer 342 (S307).

According to an embodiment, the guideline-printed layer 310 is opaque, and one side surface 311 of the guideline-printed layer 310 defines the border between the display region VA and the non-display region NVA. The guideline-printed layer 310 may be printed to surround the display region VA when viewed in a plane. To surround the display region VA, the guideline-printed layer 310 may be printed to have a closed-loop shape.

Figure 7:
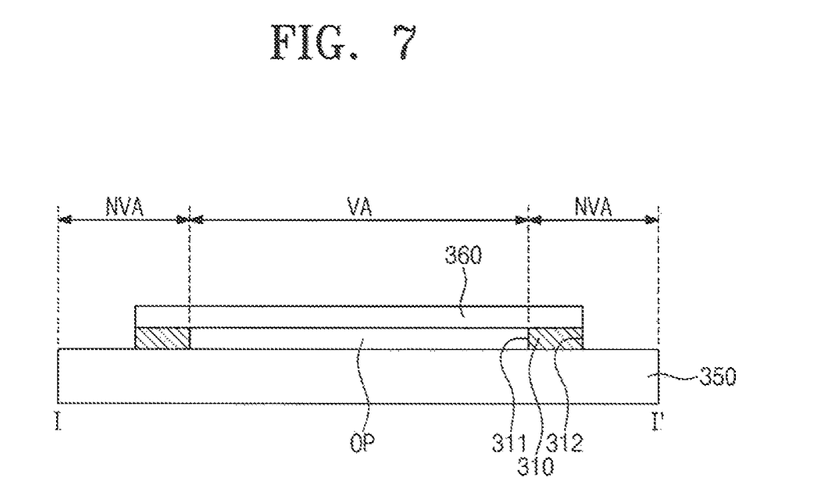

FIG. 7 is a cross-sectional view illustrating the forming of the masking-printed layer 360 (S303), illustrated in FIG. 5.

According to an embodiment, the masking-printed layer 360 is formed on the guideline-printed layer 310 and the substrate 350 to overlap the display region VA. Side surfaces of the masking-printed layer 360 may be aligned to coincide with another side surface 312 facing the one side surface 311 of the guideline-printed layer 310.

According to an embodiment, an opening OP may be provided between the masking-printed layer 360 and the substrate 350. When the opening OP is provided, the masking-printed layer 360 does not remain on the one side surface 311 of the guideline-printed layer 310 in the removing of the masking-printed layer (S308). Accordingly, the border between the display region VA and the non-display region NVA are not distorted.

Since the masking-printed layer 360 is removed in the removing of the masking-printed layer (S308), according to an embodiment, the side surface 312 of the guideline-printed layer 310 is not covered in the masking. When the masking-printed layer 360 covers the side surface 312 of the guideline-printed layer 310, a space is formed, after the masking-printed layer 360 is removed, between the side surface 312 of the guideline-printed layer 310 and a side surface 323 of the UV pattern layer 321. Accordingly, a light leakage phenomenon may occur between the side surface 312 of the guideline-printed layer 310 and the side surface 323 of the UV pattern layer 321.

The masking-printed layer 360 functions to prevent or substantially prevent the substrate 350 from being damaged in the forming of the UV pattern layer 321 and the color layer 341 by etching the UV pattern sacrificial layer 322 and the color sacrificial layer 342 (S307). Accordingly, the masking-printed layer 360 may be formed of a material which does not react with the etching solution. Specifically, this material may be an acid-resistant material which does not react with strong acid or hydrofluoric acid.

According to an embodiment, the masking-printed layer 360 is printed on the guideline-printed layer 310 and the substrate 350 such that the substrate 350 does not contact the etching solution. Since the material of the guideline-printed layer 310 does not react with the etching solution, it is sufficient that the masking-printed layer 360 overlap the display region, and, in an embodiment, the masking-printed layer 360 may not overlap the guideline-printed layer 310.

Figure 8:
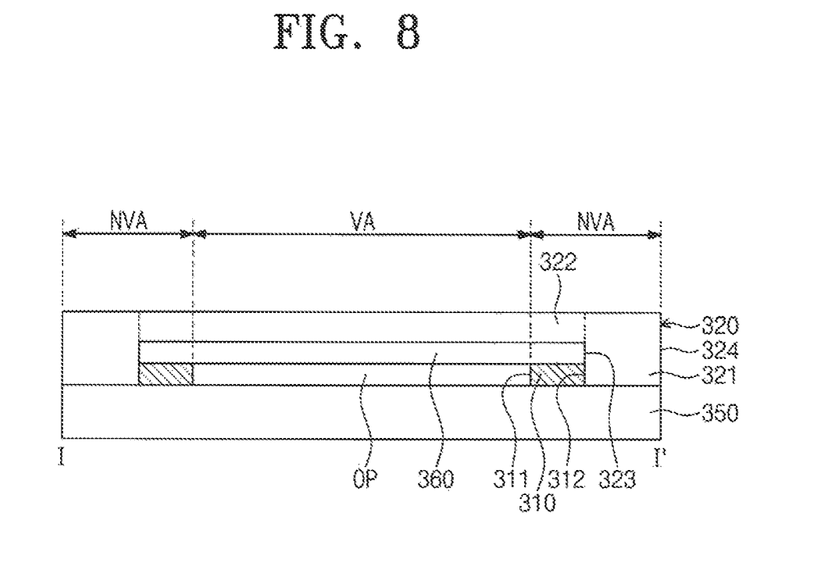

FIG. 8 is a cross-sectional view illustrating the forming of the UV pattern part 320 (S304), illustrated in FIG. 5.

Referring to FIG. 8, according to an embodiment of forming the UV pattern part 320, the UV pattern part 320 may be formed by applying a UV resin which covers the substrate 350, the masking-printed layer 360, and the guideline-printed layer 310. Although not shown, according to an embodiment, the applied UV resin may be pressed by a jig, and a pattern may be thereby formed. The pattern may be variously formed according to the shape of the jig, such as a striped pattern, or a circular pattern. The pattern-formed UV resin is cured and the UV pattern part 320 is thereby formed.

The UV pattern sacrificial layer 322 is defined on the UV pattern part 320. According to an embodiment, the UV pattern sacrificial layer 322 is removed by etching in the forming of the UV pattern layer 321 and the color layer 341 (S307).

According to an embodiment, the UV pattern part 320 may form a curved portion along the surfaces of the substrate 350, the masking-printed layer 360, and the guideline-printed layer 310. The UV pattern part 320 may have another side surface 324 opposite the side surface 323 and aligned to coincide with a side surface of the substrate 350.

Figure 9:
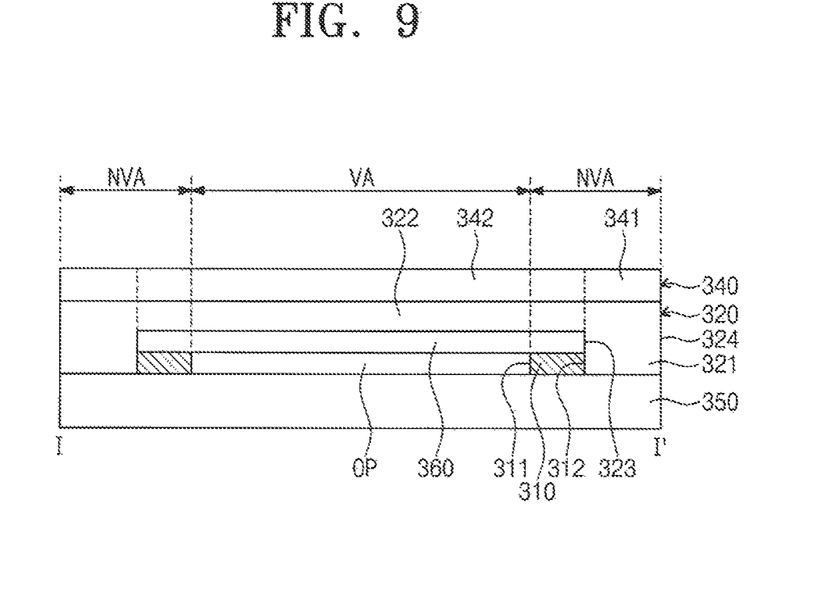

FIG. 9 is a cross-sectional view illustrating the forming of the color part 340 (S305), illustrated in FIG. 5.

The color sacrificial layer 342 is defined on the color part 340. According to an embodiment, the color sacrificial layer 342 is removed by etching in the forming of the UV pattern layer 321 and the color layer 341 (S307).

According to an embodiment, the color part 340 may be formed by laminating a plurality of layers. When the color part 340 has the plurality of layers, each layer may have a color different from each other. Various colors may be implemented by a plurality of layers.

According to an embodiment, the color part 340 may be coated and deposited with a small thickness, and may form a curved portion along the surface of the UV pattern part 320.

Figure 10:
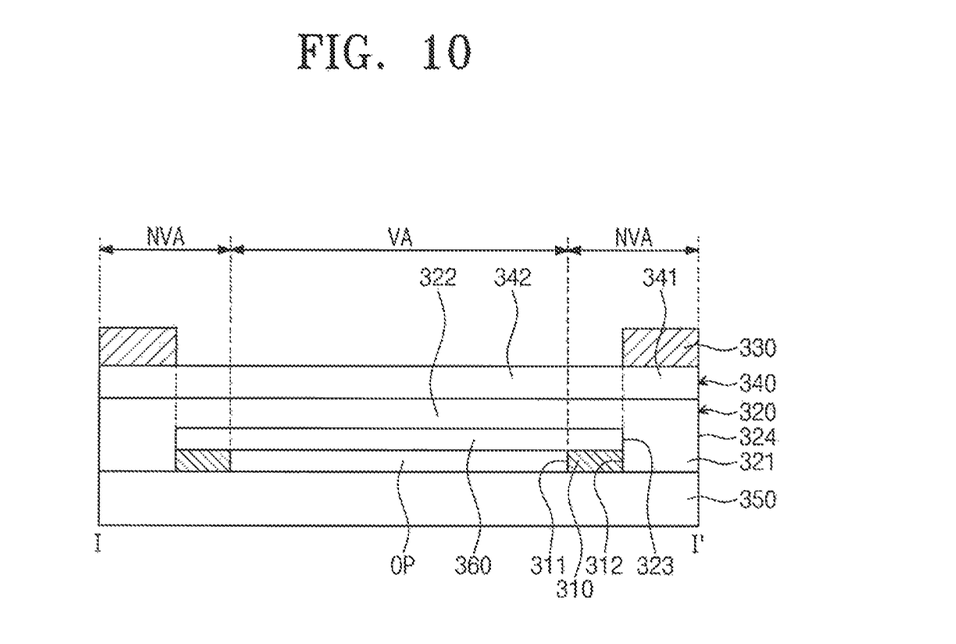

FIG. 10 is a cross-sectional view illustrating the forming of the printed layer 330 (S306), illustrated in FIG. 5.

The printed layer 330 may include an inorganic compound, such as a metal oxide, or an organic compound such as a polymer resin. The printed layer 330 may include a material which does not react with an etching solution used in the forming of the UV pattern layer 321 and the color layer 341 by etching the UV pattern sacrificial layer 322 and the color sacrificial layer 342 (S307).

Figure 11:
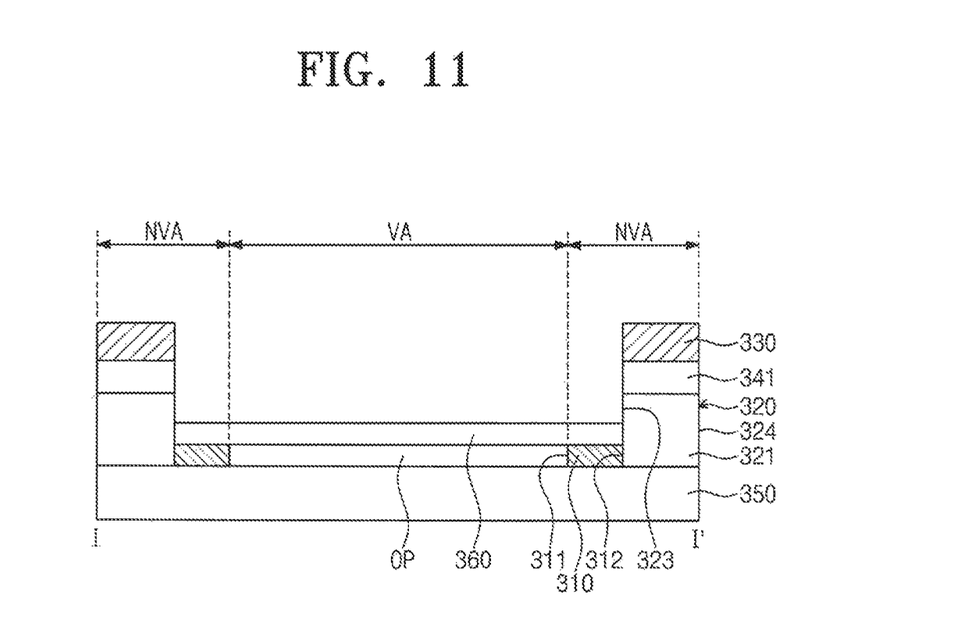

FIG. 11 is a cross-sectional view illustrating the forming of the UV pattern layer 321 and the color layer 341 (S307), illustrated in FIG. 5.

The forming of the UV pattern layer 321 and the color layer 341 (S307) may include etching by applying (e.g. by pouring) the etching solution to the UV pattern sacrificial layer 322 and the color sacrificial layer 342. The etching solution may include a material which does not react with the guideline-printed layer 310 and the masking-printed layer 360, but reacts with the UV pattern part 320 and the color part 340.

In the display region VA, the substrate 350 does not contact the etching solution due to the masking-printed layer 360. According to an embodiment, the etching solution may include hydrofluoric acid. When the substrate 350 includes glass, the etching solution may corrode the glass once the substrate 350 contacts the etching solution including hydrofluoric acid. Accordingly, the masking-printed layer 360 prevents or substantially prevents the substrate 350 from being damaged in the forming of the UV pattern layer 321 and the color layer 341 (S307).

The UV pattern sacrificial layer 322 and the color sacrificial layer 342 are removed by the etching solution. The UV pattern sacrificial layer 322 and the color sacrificial layer 342 overlap the display region VA when viewed in a plane. The UV pattern sacrificial layer 322 and the color sacrificial layer 342 may overlap the guideline-printed layer 310 when viewed in a plane. When the UV pattern sacrificial layer 322 and the color sacrificial layer 342 are removed by the etching solution, the UV pattern sacrificial layer 322 and the color sacrificial layer 342 may be over-etched or under-etched. Since the guideline-printed layer 310 is disposed between the UV pattern sacrificial layer 322 and the substrate 350, the over-etching or under-etching is not viewed by a user.

The UV pattern part 320 and the color part 340 may be concurrently (e.g., simultaneously) etched. Alternatively, the color part 340 may be first etched, and the UV pattern part may be subsequently etched.

Figure 12:
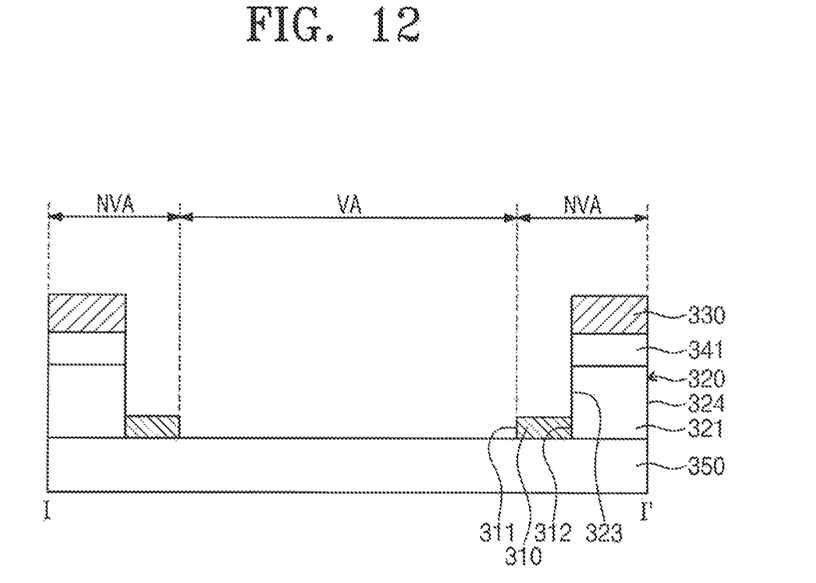

FIG. 12 is a cross-sectional view illustrating the removing of the masking-printed layer 360 (S308), illustrated in FIG. 5.

Referring to FIG. 12, the removing of the masking-printed layer 360 (S308) may include removing the masking-printed layer 360 by using a cleaning solution. The masking-printed layer 360 may include water-soluble ink. In this case, the cleaning solution may include water to react with the water-soluble ink. The cleaning solution including water does not react with glass, and the substrate 350 including glass is not damaged by the cleaning solution.

When the masking-printed layer 360 is removed by the cleaning solution including water, according to an embodiment, the periphery of the masking-printed layer 360 may not be cleaned and may remain. The peripheral portion, which is not cleaned, of the masking-printed layer 360 on the guideline-printed layer 310 is not viewed by a user due to the guideline-printed layer 310.

A cover glass, a manufacturing method thereof, and a display apparatus including the cover glass according to the present inventive concept may prevent or substantially prevent a transparent substrate from being damaged and prevent or substantially prevent a border between a display region and a non-display region from being distortedly viewed.

Although some embodiments of the present inventive concept have been described for illustrative purposes, those skilled in the art will appreciate that a variety of different modifications and variations are possible, without departing from the scope and spirit of the present inventive concept. Accordingly, such modifications and variations should also be understood as falling within the claims of the present invention.

What is claimed is:

1. A cover glass comprising:
 a transparent substrate including a display region configured to display an image and a non-display region adjacent to the display region;
 a guideline-printed layer on the substrate and comprising a first side surface defining a border between the display region and the non-display region, the guideline-printed layer configured to surround the display region when viewed in a plane;
 a UV pattern layer surrounding the guideline-printed layer when viewed in a plane, the UV pattern layer contacting a second side surface of the guideline-printed layer opposite the first side surface, the UV pattern layer arranged on a same layer as the guideline-printed layer, and overlapping the non-display region;
 an opaque printed layer facing the substrate, and having an opaque color so as to block incident light, wherein the opaque printed layer and the guideline-printed layer, in combination, entirely cover the non-display region when viewed in a plane, the UV pattern layer is between the opaque printed layer and the substrate, and the opaque printed layer overlaps the UV pattern layer when viewed in a plane, and
 wherein a portion of a side of the UV pattern layer in contact with the second side surface is exposed from the guideline-printed layer, and the side of the UV pattern layer and one side of the opaque printed layer define a same side surface; and
 a first color layer between the UV pattern layer and the opaque printed layer.

2. The cover glass of claim 1, further comprising a second color layer between the first color layer and the opaque printed layer, the second color layer having a color different from that of the first color layer.

3. The cover glass of claim 1, wherein the guideline-printed layer has a first thickness, and the UV pattern layer has a second thickness greater than the first thickness.

4. The cover glass of claim 1, wherein the guideline-printed layer has a closed-loop shape when viewed in a plane.

5. The cover glass of claim 1, wherein the guideline-printed layer comprises an acryl resin, a urethane resin, or an epoxy resin.

6. The cover glass of claim 1, wherein the substrate comprises a tempered glass.

7. The cover glass of claim 1, wherein the opaque printed layer comprises an acryl resin, a urethane resin, or an epoxy resin.

8. A method for manufacturing a cover glass, the method comprising:
 providing a transparent substrate including a display region configured to display an image and a non-display region adjacent to the display region;
 forming, on the substrate, a guideline-printed layer including a first side surface defining a border between the display region and the non-display region, the guideline-printed layer surrounding the display region when viewed in a plane;
 forming, on the guideline-printed layer, a masking-printed layer overlapping the display region;
 forming a UV pattern part to cover the substrate, the masking-printed layer, and the guideline-printed layer;
 forming, on the UV pattern part, an opaque printed layer facing the substrate and overlapping the non-display region, the opaque printed layer having an opaque color so as to block incident light, wherein the opaque printed layer and the guideline-printed layer, in combination, entirely cover the non-display region when viewed in a plane;
 forming a UV pattern layer by etching a UV pattern sacrificial layer defined by a portion of the UV pattern part exposed by the opaque printed layer, the UV pattern layer surrounding the guideline-printed layer when viewed in a plane, the UV pattern layer contacting a second side surface of the guideline-printed layer opposite the first side surface, the UV pattern layer arranged on a same layer as the guideline-printed layer, and overlapping the non-display region, wherein the UV pattern layer is between the opaque printed layer and the substrate, and the opaque printed layer overlaps the UV pattern layer when viewed in a plane;
 removing the masking-printed layer such that a portion of a side of the UV pattern layer in contact with the second side surface is exposed from the guideline-printed layer, and the side of the UV pattern layer and one side of the opaque printed layer define a same side surface; and
 forming a first color layer between the UV pattern part and the opaque printed layer.

9. The method of claim 8, wherein the guideline-printed layer is formed to have a closed-loop shape.

10. The method of claim 8, wherein the guideline-printed layer is formed by printing an acryl resin, a urethane resin, or an epoxy resin.

11. The method of claim 8, wherein an opening is provided between the masking-printed layer and the substrate.

12. The method of claim 8, further comprising forming a second color layer on the first color layer after the forming of the first color layer.

13. The method of claim 8,
 wherein the masking-printed layer comprises water-soluble ink, and
 wherein the removing of the masking-printed layer is performed by removing the masking-printed layer by using a cleaning solution.

14. The method of claim 8, wherein the forming of the UV pattern part comprises:
 applying a UV resin covering the substrate, the masking-printed layer, and the guideline-printed layer;
 forming a pattern by pressing a jig against the applied UV resin; and
 curing the UV resin.

15. The method of claim 8, wherein the forming of the UV pattern layer comprises etching the UV pattern sacrificial layer by using an etching solution, the etching solution including hydrofluoric acid.

16. The method of claim 8, wherein the UV pattern sacrificial layer overlaps the display region when viewed in a plane, and is formed overlapping the guideline-printed layer.

17. The method of claim 8, wherein the opaque printed layer is formed by printing an acryl resin, a urethane resin, or an epoxy resin.

* * * * *